(12) United States Patent
Pacheco et al.

(10) Patent No.: US 8,402,924 B2
(45) Date of Patent: Mar. 26, 2013

(54) ANIMAL TRAINING SYSTEMS AND METHODS FOR TRAINING ANIMALS NOT TO PULL EXCESSIVELY ON LEADS

(75) Inventors: Alfred D. Pacheco, Renton, WA (US); James C. Krieg, Mercer Island, WA (US)

(73) Assignee: Merren, LLC, Renton, WA (US)

( * ) Notice: Subject to any disclaimer, the term of this patent is extended or adjusted under 35 U.S.C. 154(b) by 838 days.

(21) Appl. No.: 12/203,751

(22) Filed: Sep. 3, 2008

(65) Prior Publication Data

US 2010/0050955 A1 Mar. 4, 2010

(51) Int. Cl.
*A01K 15/00* (2006.01)

(52) U.S. Cl. ........................................ 119/719; 119/712

(58) Field of Classification Search ............ 119/719, 119/712, 720, 718, 859, 908, 792, 721, 862; *A01K 15/00*
See application file for complete search history.

(56) References Cited

U.S. PATENT DOCUMENTS

| | | |
|---|---|---|
| 2,394,144 A | 2/1946 | Brose |
| 3,874,339 A | 4/1975 | Coulbourn |
| 4,202,293 A | 5/1980 | Gonda et al. |
| 4,919,082 A | 4/1990 | Tsai |
| 5,054,428 A | 10/1991 | Farkus |
| 5,353,744 A | 10/1994 | Custer |
| 5,381,129 A | 1/1995 | Boardman |
| 5,425,330 A * | 6/1995 | Touchton et al. ............ 119/721 |
| 5,494,002 A | 2/1996 | Greene |
| 5,749,324 A | 5/1998 | Moore |
| 5,911,199 A | 6/1999 | Farkas et al. |
| 5,957,093 A | 9/1999 | Balaun |
| 5,967,094 A * | 10/1999 | Grimsley et al. ............ 119/721 |
| 6,003,474 A | 12/1999 | Slater et al. |
| 6,047,664 A | 4/2000 | Lyerly |
| 6,073,589 A | 6/2000 | Curen et al. |
| 6,079,367 A | 6/2000 | Stapelfeld et al. |
| 6,116,192 A | 9/2000 | Hultine et al. |
| 6,230,661 B1 | 5/2001 | Yarnall, Jr. et al. |
| 6,269,776 B1 * | 8/2001 | Grimsley et al. ............ 119/721 |
| 6,310,553 B1 | 10/2001 | Dance |
| 6,360,697 B1 | 3/2002 | Williams |
| 6,439,167 B1 | 8/2002 | Keller |
| 6,549,133 B2 | 4/2003 | Duncan |
| 6,748,902 B1 | 6/2004 | Boesch et al. |
| 6,825,768 B2 | 11/2004 | Stapelfeld et al. |
| 6,830,013 B2 | 12/2004 | Williams |
| 6,830,014 B1 | 12/2004 | Lalor |
| 6,907,844 B1 | 6/2005 | Crist et al. |
| 2002/0073931 A1 | 6/2002 | Boesch et al. |

* cited by examiner

*Primary Examiner* — David Parsley
(74) *Attorney, Agent, or Firm* — DASCENZO Intellectual Property Law, P.C.

(57) ABSTRACT

Systems and methods for training animals not to pull excessively on leads. Some systems include a tension detector, a first stimulator adapted to emit a first stimulus, a second stimulator adapted to emit a second stimulus that is different than the first stimulus, and a controller adapted to actuate the emission of the first stimulus in response to the tension in the lead exceeding a predetermined force and to actuate the emission of the second stimulus in response to the tension in the lead exceeding the predetermined force for a predetermined length of time. Some methods include detecting that a tension in the lead exceeds a predetermined force, automatically emitting the first stimulus, and if the tension in the lead exceeds the predetermined force for a predetermined length of time, automatically emitting the second stimulus.

28 Claims, 5 Drawing Sheets

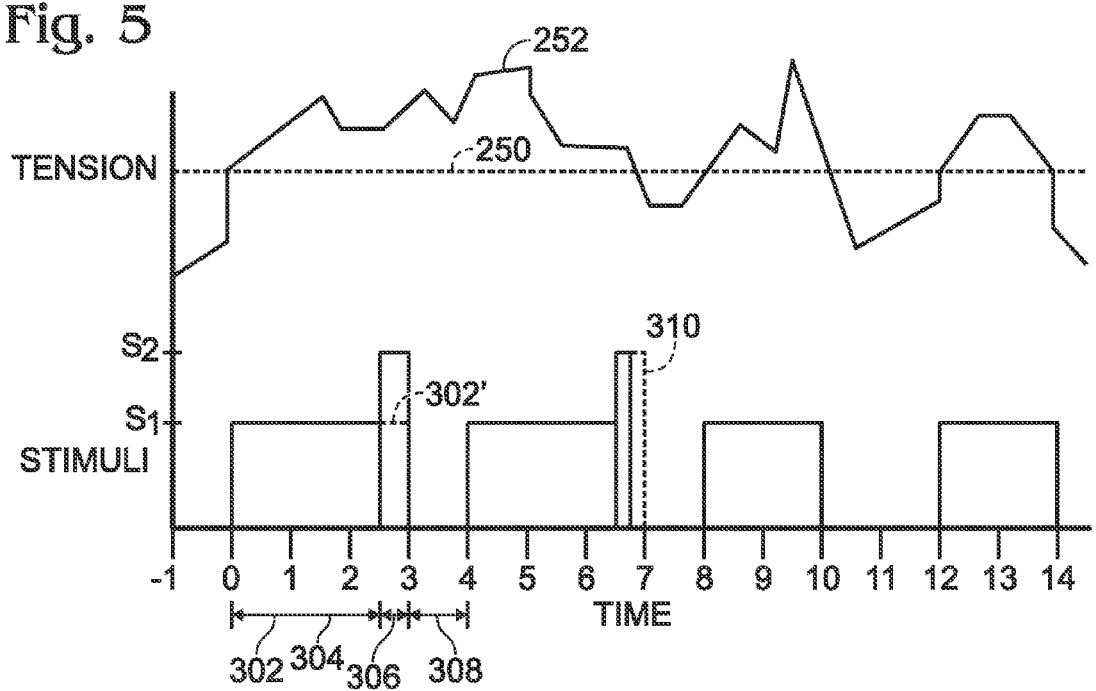
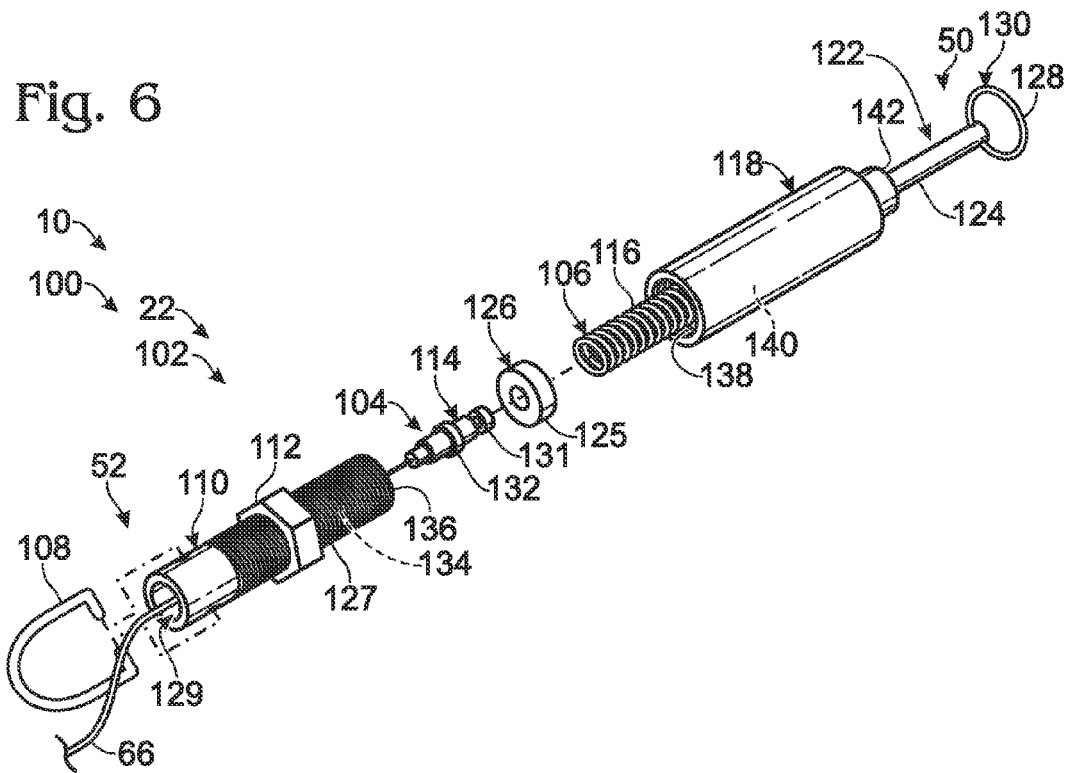

ANIMAL TRAINING SYSTEMS AND METHODS FOR TRAINING ANIMALS NOT TO PULL EXCESSIVELY ON LEADS

FIELD OF THE DISCLOSURE

The present disclosure relates generally to animal training systems, and more particularly to animal training systems adapted to discourage excessive pulling on leads and to methods for training animals not to pull excessively on leads.

BACKGROUND OF THE DISCLOSURE

Animals are often restrained by humans, for example, with a collar and leash for walking a dog. It is often a challenge to train an animal, whether domesticated or otherwise, not to pull excessively on a leash or other lead. Such excessive pulling not only may be harmful to the animal, but also may be aggravating to a person attempting to restrain, or control, the animal. Choker collars, spiked collars, and collars that incorporate electric shock devices have all been used and may—in varying degrees—be successful for controlling and/or training an animal.

SUMMARY OF THE DISCLOSURE

Systems according to the present disclosure for training an animal not to pull excessively on a lead coupled to the animal's collar may include a tension detector adapted to detect when a tension in the lead exceeds a predetermined force, a first stimulator adapted to emit a first stimulus to the animal, a second stimulator adapted to emit a second stimulus to the animal, and a controller adapted to actuate the first stimulus in response to the tension in the lead exceeding the predetermined force and actuate the second stimulus in response to the tension in the lead exceeding the predetermined force for a predetermined length of time.

Methods of operation of systems according to the present disclosure may include detecting that a tension in the lead exceeds a predetermined force, automatically emitting a first stimulus to the animal, and after the tension in the lead exceeds the predetermined force for a predetermined length of time, automatically emitting a second stimulus to the animal that is different from the first stimulus.

In some systems and methods according to the present disclosure, the first stimulus may include a sound and the second stimulus may include an electric shock.

BRIEF DESCRIPTION OF THE DRAWINGS

FIG. 5 is a diagram illustrating a non-exclusive example of a sequence of operation of systems and methods according to the present disclosure.

FIG. 6 is an exploded perspective side view of an illustrative, non-exclusive example of a tension detector of an animal training system according to the present disclosure.

DETAILED DESCRIPTION AND BEST MODE OF THE DISCLOSURE

Figure 1:
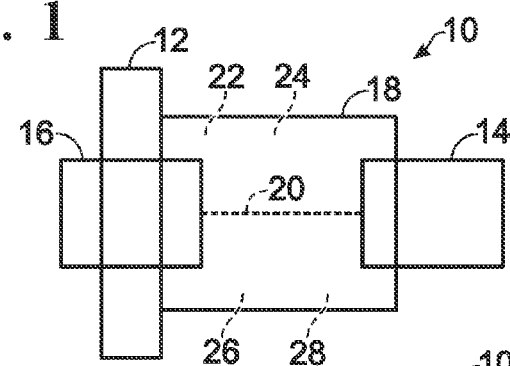
FIG. 1 is a block diagram schematically illustrating animal training systems according to the present disclosure, together with an associated animal.

Systems according to the present disclosure for training an animal not to pull excessively on a lead are schematically illustrated in FIG. 1 and generally indicated at 10. Systems 10 and associated methods according to the present disclosure utilize stimuli—spaced-apart in time and in response to tension in a lead—to train an animal not to pull excessively on the lead.

In FIG. 1, an animal is schematically illustrated at 12 and a lead is schematically illustrated at 14. As illustrated, the lead may be coupled to the animal via a collar, or other harness, 16. In such systems, system 10 may also be referred to as a system for training an animal not to pull excessively on a lead coupled to a collar on the animal. Systems 10 according to the present disclosure include a corrective assembly 18, and some systems also may (but are not required to) include the lead and/or the collar and/or portions thereof. In some systems, the lead and/or the collar and/or portions thereof may be considered to be part of the corrective assembly.

As used herein, "lead" refers to any configuration of leash or other restraint used to tether an animal to a person or to an object. For example, a standard strap leash that may be used to walk a dog or other animal, and a chain or a rope that may be used to secure a dog or other animal to an object such as a tree or a post, are all considered leads within the scope of the present disclosure. The systems and methods of the present disclosure are not limited to utilizing only what may be considered to be a standard handled leash, nor are they limited to being utilized with domestic animals such as dogs and cats. For example, the systems and methods according to the present disclosure are equally applicable to animals such as may be kept in zoos, used by circuses, raised as livestock, etc. Any restraint used to tether an animal to a person or an object and that may be pulled on by an animal—simply as a result of the animal being restrained proximate the person or object by the restraint—is within the scope of the present disclosure and is within the scope of "lead," as used herein.

FIG. 1 illustrates a collar 16 extending on more than one side of an associated animal, schematically representing that, as used herein, "collar" refers to any configuration of a device (or devices) that may be secured to an animal and thus utilized to secure the animal to a lead. As used herein, a "collar" is not limited to strap collars that are configured for securement around the neck of an animal, and may be any device (or devices) that is utilized to secure an animal to a lead. For example, harnesses that are secured around the upper torso, or any other portion, of an animal are also within the scope of the present disclosure and within the scope of "collar," as used herein. As schematically illustrated in a dashed line at 20 in FIG. 1, a collar may (but is not required to) be directly coupled to a lead. Additionally or alternatively, a collar may be indirectly coupled to a lead, for example, via one or more portions or components of a corrective assembly 18 of a system 10 according to the present disclosure.

Corrective assemblies 18 may include one or more of a tension detector 22 that is adapted to detect tension in a lead, a stimulator 24 that is adapted to emit a first stimulus to an animal, a stimulator 26 that is adapted to emit a second stimulus to an animal, and a controller 28 that is adapted to control operation of systems and methods according to the present disclosure, such as to control actuation of the first stimulus and the second stimulus. Corrective assembly 18 is schematically illustrated in FIG. 1 as overlapping lead 14, schematically representing that the corrective assembly may (but is not required to) be directly coupled to the lead. Additionally or alternatively, a portion of the corrective assembly may form a portion of the lead. Stated differently, the lead may include the corrective assembly or a portion thereof. Corrective assembly 18 also is schematically illustrated in FIG. 1 as overlapping collar 16, schematically representing that at least a portion of the corrective assembly may (but is not required to) be directly coupled to the collar. Additionally or alternatively, a portion of the corrective assembly may form a portion of the collar. Stated differently, the collar may include the corrective assembly or a portion thereof. Finally, corrective assembly 18 is schematically illustrated in FIG. 1 as abutting animal 12, schematically representing that a portion of the corrective assembly may (but is not required to) contact, or engage, the animal. Additionally or alternatively, the stimulators 24, 26 of the corrective assembly may at least be in a position relative to the animal such that they may effectively stimulate the animal and/or emit a stimulus to the animal, as described herein.

Tension detector 22 may include any device adapted to detect tension in a lead. For example, a tension detector may be adapted to detect when tension in a lead exceeds a predetermined force, or threshold tension. Alternatively and equally within the scope of the present disclosure, a tension detector may constantly, or even intermittently, detect, or measure, tension in the lead, and the controller 28 may actually detect, or determine, when the tension exceeds a predetermined force.

Stimulators 24, 26 may be separate stimulators adapted to emit separate stimuli to an animal. Additionally or alternatively, a single stimulator may be provided that is adapted to emit separate stimuli to an animal (i.e., a first stimulus and a second stimulus that is different from the first stimulus). More specifically, systems and methods according to the present disclosure utilize at least two different stimuli but may include one or more stimulators adapted to emit the at least two different stimuli. The stimuli may be described as having a varying degree of stimulation, harshness, painfulness, intensity, or other level of correctiveness. Stated differently, a first stimulus may be of a different nature than a second stimulus. Stated further differently, a first stimulus may be configured to have a different corrective nature than a second stimulus. That is, a first stimulus may tend to be a lesser deterrent against an animal pulling excessively on a lead than a second stimulus, or vice versa. Stated differently, a first stimulus may be configured to be of a lesser corrective nature than a second stimulus, or vice versa. The level, or degree, of correctiveness may vary between different types, sizes, weights, and even breeds of animals.

Illustrative, non-exclusive examples of stimuli that may be used with systems and methods according to the present disclosure include (but are not limited to) sounds, vibrations, and electric shocks. Any combination of one or more stimuli may be utilized and may be adapted for providing the different degrees of stimulation of an animal. For example, a first stimulus may include at least one of a first sound, a first vibration, and a first electric shock, and a second stimulus may include at least one of a second sound, a second vibration, and a second electric shock, with the second stimulus having at least a different corrective nature than the first stimulus. For example, even though the first and second stimuli may both be sounds, a second sound may be louder, or harsher, than a first sound. Similarly, a second electric shock may be implemented using a higher voltage or for a longer duration than a first electric shock, the second electric shock thereby being of a different, greater corrective nature than the first electric shock. Additionally or alternatively, a first stimulus may include a sound and the second stimulus may include an electric shock. Other configurations are equally within the scope of the present disclosure. For example, in some embodiments the second stimulus may include an electric shock and the first stimulus may not include an electric shock.

Figure 2:
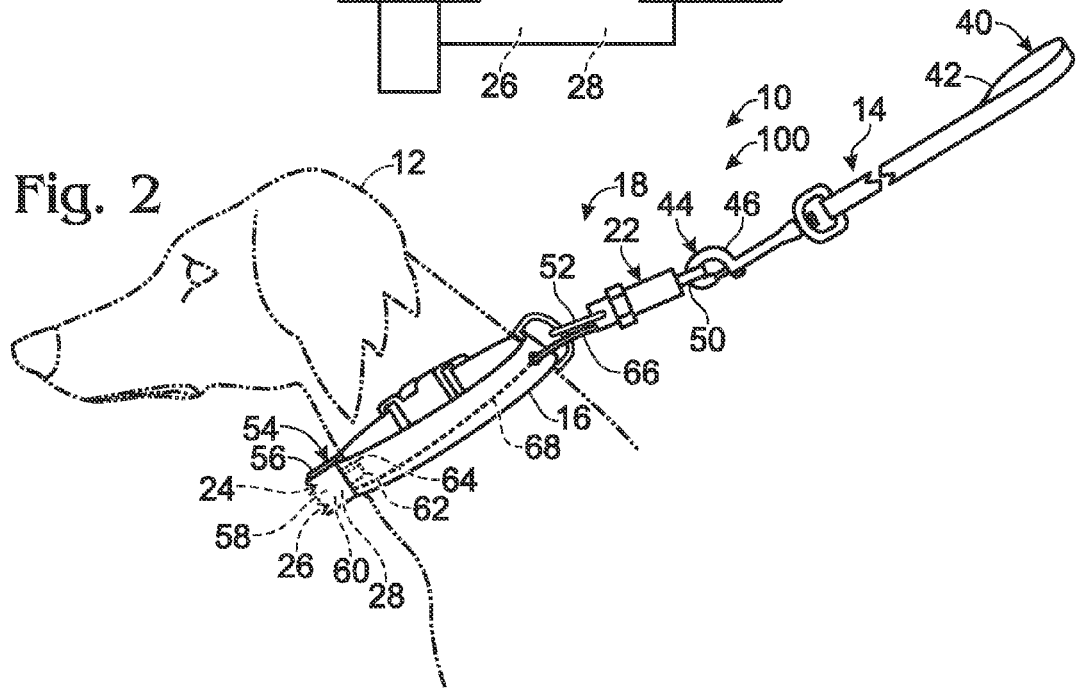
FIG. 2 is a perspective side view of an illustrative, non-exclusive example of an animal training system according to the present disclosure, together with an associated animal.

An illustrative, non-exclusive example of an animal training system 10 according to the present disclosure is illustrated in FIG. 2 and generally indicated at 100, together with an associated animal 12 in the form of a dog. System 100 includes a lead 14, a collar 16, and a corrective assembly 18. The illustrated lead may be described as a standard leash, such as which may be constructed of nylon webbing or other suitable material. Lead 14 has a first end region 40 with a hand loop or other handle 42 for grasping by a user, and a second end region 44 with a releasable clasp 46 that is adapted for securement to a collar, or in the example of use with a system 100 according to the present disclosure, to the corrective assembly 18. Other configurations of leads may be used with systems 100 according to the present disclosure. For example, it is within the scope of the present disclosure for second end region 44 to be integrated or otherwise non-releasably connected to the corrective assembly.

The corrective assembly of system 100 includes a tension detector 22 that interconnects the lead to the collar, which is secured around the neck of the dog. The tension detector of system 100 has a first end region 50 that is adapted for securement to the lead, and a second end region 52 that is adapted for securement to the collar.

The corrective assembly also includes a sub-assembly 54 that includes a housing 56 that houses at least a first stimulator 24, a second stimulator 26, and a controller 28. The first stimulator of system 100 includes a sound emitter 58 that is adapted to emit sounds audible to the dog being trained not to pull excessively on the lead. The second stimulator of system 100 includes an electric shock device 60, which includes first and second probes 62, 64 extending from housing 56 and adapted to engage the neck of the dog being trained not to pull excessively on the lead.

The tension detector and the controller of system 100 are operatively coupled by wiring 66. In the illustrative, non-exclusive example of system 100, the wiring extends from the second end region 52 of the tension detector and is routed through a passage 68 in the collar 16 and to the sub-assembly 54. Other configurations are equally within the scope of the present disclosure.

Figure 3:
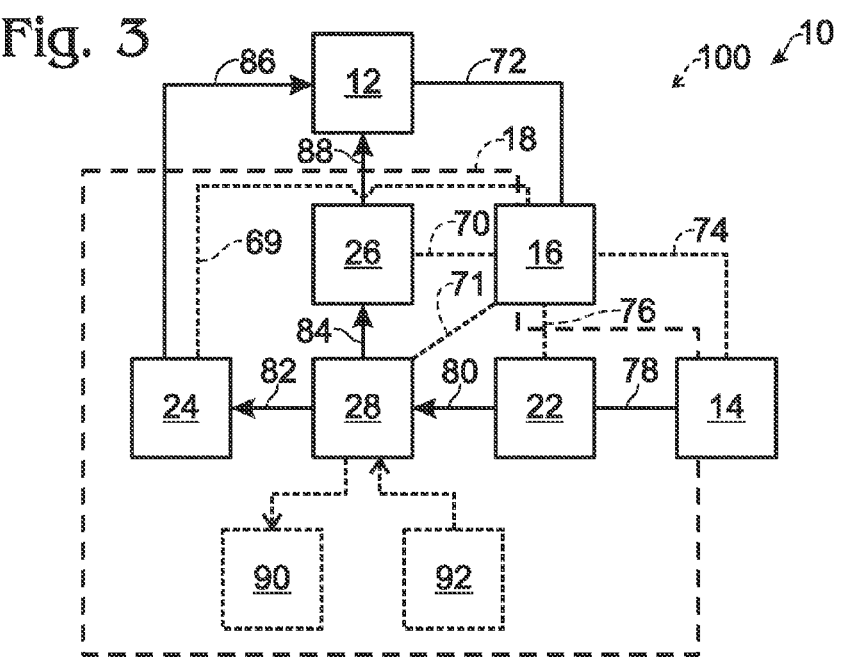
FIG. 3 is another block diagram schematically illustrating animal training systems according to the present disclosure, together with an associated animal.

FIG. 3 schematically illustrates components of systems 10, including systems 100, according to the present disclosure. FIG. 3 illustrates examples of the relationships and interactions between the components and with an associated animal 12. As indicated, a system 10 may include a corrective assembly 18, which may include at least a tension detector 22, a first stimulator 24, a second stimulator 26, and a controller 28. As mentioned, although not required, the corrective assembly may further include one or both of a lead 14 and a collar 16 and/or a portion of one or both of a lead and a collar, as schematically illustrated in FIG. 3. In some embodiments, and as schematically illustrated with dashed lines at 69, 70, and 71, one or more of first stimulator 24, second stimulator 26, and controller 28, respectively, may be coupled to collar 16.

As schematically illustrated with a solid line at 72, the collar 16 may be directly coupled to the animal. As schematically illustrated with a dashed line at 74, the lead 14 may be directly coupled to the collar. Alternatively, as schematically illustrated with a dashed line at 76 and a solid line at 78, the lead 14 may be indirectly coupled to the collar via the tension detector 22 (e.g., as in a system 100 according to the present disclosure and discussed herein).

As schematically illustrated at 80, tension detector 22 and controller 28 are operatively coupled such that the controller is adapted to receive a signal from the tension detector at least when the tension in the lead exceeds a predetermined force. Additionally or alternatively, as mentioned, the tension detector may constantly, or even intermittently, detect, or measure, tension in the lead, and the controller 28 may be programmed or otherwise configured to actually detect, or determine, when the tension exceeds a predetermined force.

As schematically illustrated at 82 and 84, the controller is adapted to actuate the first and second stimulators 24, 26, and thus actuate the emission/generation of the first and second stimuli, which are emitted to the animal 12, as schematically illustrated at 86 and 88, respectively. A controller 28 according to the present disclosure may include any suitable structure and/or software adapted to interact with and/or control the tension detector and the first and second stimulators. For example, a non-exclusive example of a controller may include a preprogrammed microprocessor. Additionally or alternatively, a controller may include a printed circuit board and associated electronics. Other configurations of controllers are equally within the scope of the present disclosure.

As schematically illustrated in dashed lines in FIG. 3, systems 10 according to the present disclosure may (but are not required to) further include one or more of an output 90 and/or an input 92 operatively coupled to the controller. In some embodiments, though not required, an output and/or an input may comprise a portion of a sub-assembly, such as a sub-assembly 54 of system 100 illustrated in FIG. 2. An output 90 may include a status indicator adapted to indicate various conditions of a system 10 to a user of the system, such as (but not limited to) indication of emission of one or both of the first and second stimuli, the level of correctiveness of one or both of the first and second stimuli, battery level, a setting of various optional inputs, etc. An input 92 may include user controls adapted to receive various adjustments of the first and second stimuli, timing of the stimuli, type or size of animal being trained, etc.

Figure 4:
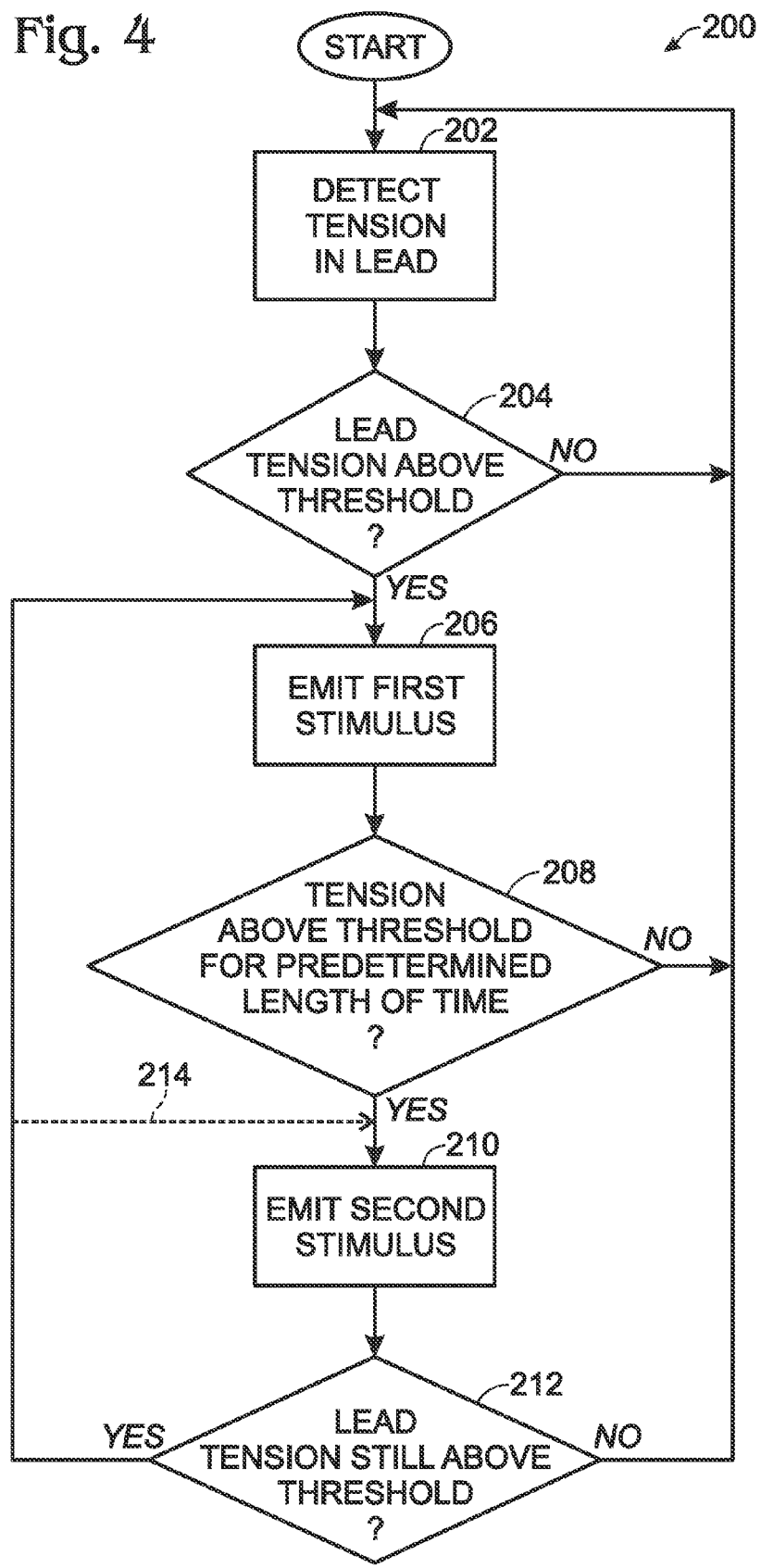
FIG. 4 is a flow chart illustrating operation of animal training systems according to the present disclosure and methods according to the present disclosure for training animals not to pull excessively on leads.

Illustrative, non-exclusive examples of operations of systems 10 and methods according to the present disclosure for training an animal not to pull excessively on a lead are schematically illustrated in FIG. 4, and are indicated generally at 200. One or more steps of the described operations of systems and methods according to the present disclosure may be described as not requiring cognition by a person, for example, because the one or more steps may be carried out by the system itself, such as by a preprogrammed microprocessor and/or as by dictated by the physical properties of a component of a system according to the present disclosure (e.g., by the properties of a tension detector as discussed herein). Stated differently, one or more steps of the described operations of systems and methods according to the present disclosure may be performed automatically by the system, such as by the controller or other portion of the corrective assembly, and may not require any determination, calculation, or action by the user.

First, as indicated at 202, tension in the lead is detected (e.g., by a tension detector and/or a controller of a system 10). Next (or simultaneously with the detection 202), and as indicated at 204, whether or not the tension in the lead exceeds a predetermined force, or threshold tension, is detected (e.g., by a tension detector and/or a controller of a system 10). Non-exclusive examples of a threshold tension include forces in the 5-15 pound range, including (but not limited to) threshold tensions of at least 6, 8, 10, 12, and 14 pounds. Forces less than 5 pounds and greater than 15 pounds are within the scope of the present disclosure.

If the tension in the lead is not above the predetermined threshold tension, then no stimulus is emitted and the system and/or method continues to detect tension in the lead, as indicated at 202. On the other hand, as indicated at 206, if the tension in the lead is above the threshold tension, then a first stimulus is emitted to the animal (e.g., by a stimulator of a system 10). Stated differently, responsive to the tension in the lead exceeding the threshold tension, a first stimulus is automatically emitted by the system, such as by the first stimulator. The first stimulus may be emitted (or intermittently emitted) for up to a predetermined length of time and/or may be emitted until the tension in the lead falls below the threshold tension. That is, in some examples of systems and methods according to the present disclosure, the first stimulus may be emitted for a predetermined length of time regardless of whether the tension in the lead remains above the threshold tension for the predetermined length of time. Alternatively, in some examples of systems and methods according to the present disclosure, the first stimulus may be emitted either for a predetermined length of time if the tension in the lead remains above the threshold tension, or until the tension in the lead falls below the threshold tension if it does so before the predetermined length of time has elapsed. Non-exclusive examples of a predetermined length of time that may be appropriate for emission of a first stimulus include times in the 1-15 second range, including (but not limited to) times of at least 2, 4, 6, 8, 10, 12, and 14 seconds. Times less than 1 second and greater than 15 seconds are within the scope of the present disclosure. For purposes of discussion, the predetermined time associated with the duration of the emission of a first stimulus may be referred to as the first predetermined length of time.

Next (or simultaneously with the emission of the first stimulus), and as indicated at 208, whether or not the tension in the lead exceeds the predetermined force for a predetermined length of time (as indicated at 210) is detected (e.g., by a tension detector and/or a controller of a system 10). Non-exclusive examples of a predetermined length of time that may be appropriate for triggering the second stimulus include times in the 1-15 second range, including (but not limited to) times of at least 2, 4, 6, 8, 10, 12, and 14 seconds. Times less than 1 second and greater than 15 seconds are within the scope of the present disclosure. For purposes of discussion, this predetermined length of time (prior to emission of the second stimulus) may be referred to as the second predetermined length of time. The second predetermined length of time may (but is not required to) be the same as the first predetermined length of time for which the first stimulus is emitted (or intermittently emitted).

If the tension in the lead is not above the threshold tension for the second predetermined length of time, then the second stimulus is not emitted and the system and/or method continue to detect tension in the lead at 202. On the other hand, and as indicated at 210, if the tension in the lead is above the threshold tension for at least the second predetermined length of time, then a second stimulus is emitted to the animal (e.g., by a stimulator of a system 10). Stated differently, after emitting the first stimulus to the animal has commenced, and responsive to the tension in the lead exceeding the threshold tension for the second predetermined non-zero length of time, a second stimulus is automatically emitted. Accordingly, if the second stimulus is emitted to the animal, it will be emitted after emission of the first stimulus to the animal has begun, or commenced. It is within the scope of the present disclosure that the emission of the first stimulus to the animal may or may not have ceased when the emission of the second stimulus to the animal commences. The second stimulus may be emitted (or intermittently emitted) for up to a predetermined length of time and/or may be emitted until the tension in the lead falls below the threshold tension. This predetermined length of time in which the second stimulus is emitted may be referred to as a third predetermined length of time.

In some examples of systems and methods according to the present disclosure, the second stimulus may be emitted for a predetermined length of time regardless of whether the tension in the lead remains above the threshold tension after the second predetermined length of time. Alternatively, in some examples of systems and methods according to the present disclosure, the second stimulus may be emitted either for a predetermined length of time if the tension in the lead remains above the threshold tension, or until the tension in the lead falls below the threshold tension if it does so before the predetermined length of time has elapsed. Non-exclusive examples of a predetermined length of time that may be appropriate for maximum duration of emission of a second stimulus include times in the 0.1-5 second range, including (but not limited to) times of 0.5, 1.0, 1.5, 2, and 3 seconds. Times less than 0.1 seconds and greater than 3 seconds are within the scope of the present disclosure. For purposes of discussion, the predetermined length of time associated with maximum duration of emission of a second stimulus may be referred to as the third predetermined length of time.

The timing of activation of the second stimulus may be irrespective of an actual tension in the lead above a threshold tension. In other words, the triggering, or activation, of the second stimulus may be based on a predetermined threshold tension and a predetermined non-zero length of time, but not on an actual tension in the lead above the predetermined threshold tension experienced subsequent to the tension in the lead exceeding the predetermined threshold tension. Stated differently, the second stimulus may not be triggered, or actuated, based on a second threshold tension that is different from the predetermined threshold tension upon which the actuation of the first stimulus is determined.

Additionally, though not required, a system according to the present disclosure may begin to store a potential for the emission of the second stimulus when the tension in the lead exceeds the predetermined threshold tension. In other words, responsive to the tension in the lead exceeding the predetermined threshold tension, the system may automatically store a potential for automatically emitting the second stimulus after the second predetermined length of time. That is, prior to the tension in the lead exceeding the threshold tension, the system may be incapable of emitting the desired second stimulus. Such systems may be described as including a storage device adapted to store a potential for actuation of the second stimulus. For example, in an example of a second stimulus being a vibration, the vibration may (but is not required to) be produced by release of a mechanical potential, such as stored in a coiled torsion spring, which prior to the tension in the lead exceeding the threshold tension may not be coiled beyond its state of equilibrium. In an example of a second stimulus being an electric shock, the shock may (but is not required to) be produced by a release of an electric potential, such as a voltage stored in a capacitor, which prior to the tension in the lead exceeding the threshold tension may not be charged with the necessary voltage to emit the desired shock.

Next, as indicated at 212, whether or not the tension in the lead continues to exceed the threshold tension for a predetermined length of time (as measured from when the tension in the lead exceeds the threshold tension) may be detected (e.g., by a tension detector and/or a controller of a system 10). Non-exclusive examples of a predetermined length of time associated with tension in the lead continuing to exceed the threshold tension even after the second stimulus has been emitted include times in the 2-20 second time range, including (but not limited to) times of at least 4, 6, 8, 10, 12, 14, 16, and 18 seconds. Times less than 4 seconds and greater than 20 seconds are within the scope of the present disclosure. For purposes of discussion, the predetermined length of time associated with tension in the lead continuing to exceed the threshold tension even after emission of the second stimulus may be referred to as the fourth predetermined length of time. The fourth predetermined length of time also may be referred to as the predetermined length of time associated with subsequent activation of the first stimulus when the tension in the lead remains above the threshold tension.

If the tension in the lead is not still above the threshold tension for the fourth predetermined length of time, then no further stimulus is immediately emitted and the system and/or method may continue to detect tension in the lead at 202. On the other hand, if the tension in the lead is above the threshold tension for the fourth predetermined length of time, then the system and/or method return to step 206 and the first stimulus is again emitted. Alternatively, in some examples of systems and methods according to the present disclosure, and as indicated in dashed lines at 214, if the tension in the lead is above the predetermined threshold tension for the fourth predetermined length of time, then the system and/or method may return to step 210 and the second stimulus may be emitted again. Stated differently, it is within the scope of the present disclosure that the systems and methods may, but are not required to, not emit a stimulus to the animal after the emission of the second stimulus for the third predetermined length of time irrespective of whether the tension in the lead still exceeds the predetermined force. However, if the animal persists in pulling on the lead and thereby exerting more than the predetermined force, then the methods and/or devices may be configured to repeat all or portions of the corrective emission of the first and/or second stimuli.

Operation of systems and methods according to the present disclosure may continuously cycle as illustrated in FIG. 4 until a user chooses to cease operation of a system 10 or implementation of a method 200, for example, by removing a system 10 from an animal being trained, by detaching a lead from a system 10, or by turning the system off.

The various predetermined lengths of times discussed herein also may be described as predetermined non-zero lengths of time.

An illustrative, non-exclusive example of a sequence of events that may result from operation of a system 10 or implementation of a method 200 is graphically illustrated in FIG. 5. In FIG. 5, the vertical, or Y, axis represents both tension in the lead and activation of stimuli. The horizontal, or X, axis represents time. The horizontal dashed line 250 represents the predetermined force, or threshold tension, which triggers activation of the stimuli, as described herein, and the corresponding solid line 252 represents an example of an actual tension in a lead over time, as caused by an animal pulling on a lead and detected by the tension detector. Emission of stimuli is indicated with $S_1$ representing emission of a first stimulus and $S_2$ representing emission of a second stimulus. The respective levels of the illustrated stimuli do not necessarily represent respective levels of potential correctiveness, or intensity, of the stimuli; however, as discussed herein, the stimuli may (but are not required to) be adapted to have different levels of correctiveness and may take different forms/natures.

In the illustrated example, the predetermined length of time associated with the maximum duration of emission of the first stimulus is 2.5 seconds. The predetermined length of time associated with the activation of the second stimulus after activation of the first stimulus is also 2.5 seconds. The predetermined length of time associated with maximum duration of emission of the second stimulus is 0.5 seconds. Finally, the predetermined length of time associated with subsequent activation of the first stimulus when the tension in the lead remains above the predetermined force is 4 seconds. These various predetermined lengths of time are provided as examples only, and as mentioned, other predetermined lengths of time (including longer and shorter lengths of time) are within the scope of the present disclosure.

In the illustrated example, the tension in the lead first exceeds the threshold tension at time zero, and remains above the threshold tension for about 6.75 seconds. The tension in the lead again exceeds the threshold tension at 8 seconds, before falling below the threshold tension again at 10 seconds. Finally the tension in the lead exceeds the threshold tension one more time at 12 seconds before falling below the threshold tension at 14 seconds.

Following the actual tension in the lead over time, when the actual tension in the lead exceeds the threshold tension (at time zero in FIG. 5), the first stimulus is emitted for the first predetermined length of time (i.e., 2.5 seconds), as indicated at 302. After the second predetermined length of time (i.e., 2.5 seconds), as indicated at 304, the tension in the lead is still above the threshold tension, and it remains above this threshold tension for the third predetermined length of time. Therefore, the second stimulus is emitted for the third predetermined length of time (i.e., 0.5 seconds), as indicated at 306. As discussed herein, the first predetermined length of time is not required to be equal to the second predetermined length of time. For example, the first predetermined length of time may be greater than the second predetermined length of time and may in fact be equal to the sum of the second and third predetermined length of time, as indicated by a dashed line at 302'. As discussed, other configurations and relative lengths of time are within the scope of the present disclosure.

When the actual tension in the lead has continued to exceed the predetermined force for the fourth predetermined length of time (i.e., 4 seconds), as indicated at 308, the first stimulus is again emitted for the first predetermined length of time (i.e., 2.5 seconds), after which the second stimulus is again emitted, because the tension remains above the threshold tension. However, prior to the elapse of the third predetermined length of time (i.e., 0.5 seconds) in this second instance, the tension in the lead falls below the predetermined force, as indicated at about time 6.75 seconds. Accordingly, the second stimulus is emitted for less than the third predetermined length of time (in the illustrated example, for about 0.25 seconds). However, as discussed herein and as illustrated in dashed lines at 310, it is within the scope of the present disclosure that the second stimulus may be emitted for the full third predetermined length of time regardless if the tension in the lead falls below the threshold tension prior to the third predetermined length of time elapsing.

Next, when the tension in the lead again exceeds the predetermined force at 8 seconds, the first stimulus is again emitted for a third time. However, the tension in the lead falls below the predetermined threshold tension prior to elapse of the first predetermined time (i.e., 2.5 seconds), and therefore, the first stimulus is emitted for less than the first predetermined length of time (in the illustrated example, for only 2 seconds). The system then returns to detecting the tension in the lead to determine if the tension again exceeds the threshold tension.

In FIG. 5, the tension in the lead again exceeds the predetermined threshold tension at time 12 seconds, and as illustrated, the first stimulus is emitted for a fourth time. However, the tension in the lead falls below the predetermined threshold tension prior to elapse of the first predetermined length of time (i.e., 2.5 seconds), and therefore, the first stimulus is emitted for less than the first predetermined time (in the illustrated example, for only 2 seconds).

As mentioned, FIG. 5 illustrates a non-exclusive example of a sequence of operation of a system and/or a method according to the present disclosure, based on a hypothetical animal pulling on a lead. FIG. 5 illustrates that operation of systems and methods according to the present disclosure may include a variety of sequences. For example, as illustrated between time zero and 3 seconds in the sequence of FIG. 5, a first stimulus may be emitted followed by emission of a second stimulus, each for their maximum duration (i.e., for the first predetermined length of time and the third predetermined length of time, respectively). This sequence may be described as a full cycle, because both the first and second stimuli were emitted for their maximum durations because the tension in the lead exceeded and remained above the threshold tension for at least the sum of the second predetermined length of time and the third predetermined length of time.

As illustrated between 4 and 7 seconds in the sequence of FIG. 5, a first stimulus may be emitted followed by emission of a second stimulus, but during emission of the second stimulus, the tension in the lead may fall below the threshold tension, and therefore the second stimulus may be emitted for less than the third predetermined length of time. This sequence may be described as less than a full cycle. When taking into account between zero and 7 seconds in the sequence of FIG. 5, a full cycle may be followed by less than a full cycle; however, it is within the scope of the disclosure that two or more full cycles may result in a sequence if the tension in the lead exceeds and remains above the threshold tension for the necessary length of time.

As illustrated between 8 and 10 seconds and between 12 and 14 seconds in FIG. 5, a first stimulus may be emitted without being followed by a second stimulus because the tension in the lead may fall below the threshold tension prior to elapse of the second predetermined length of time. When taking into account the sequence of FIG. 5 between 8 seconds and 14 seconds, a first stimulus may be emitted twice without any emission of a second stimulus because the tension in the lead may not remain above the threshold tension for the necessary length of time.

As mentioned, the various predetermined lengths of time that may be associated with systems and methods according to the present disclosure may be referred to as first, second, third, and fourth predetermined lengths of time to distinguish them from each; however, systems and methods according to the present disclosure are not required to include, or encompass, four predetermined lengths of time. Accordingly, the present application may include claims with less than four distinct predetermined lengths of time, and such claims may use "first," "second," "third," and so on to distinguish such predetermined lengths of time from each other, with such identifications serving only to distinguish the predetermined lengths of time within the claim or related claims and the identifications in the claims do not directly refer to the "first," "second," "third" and "fourth" predetermined lengths of time used in the discussion herein in reference to FIGS. 4-5.

Figure 7:
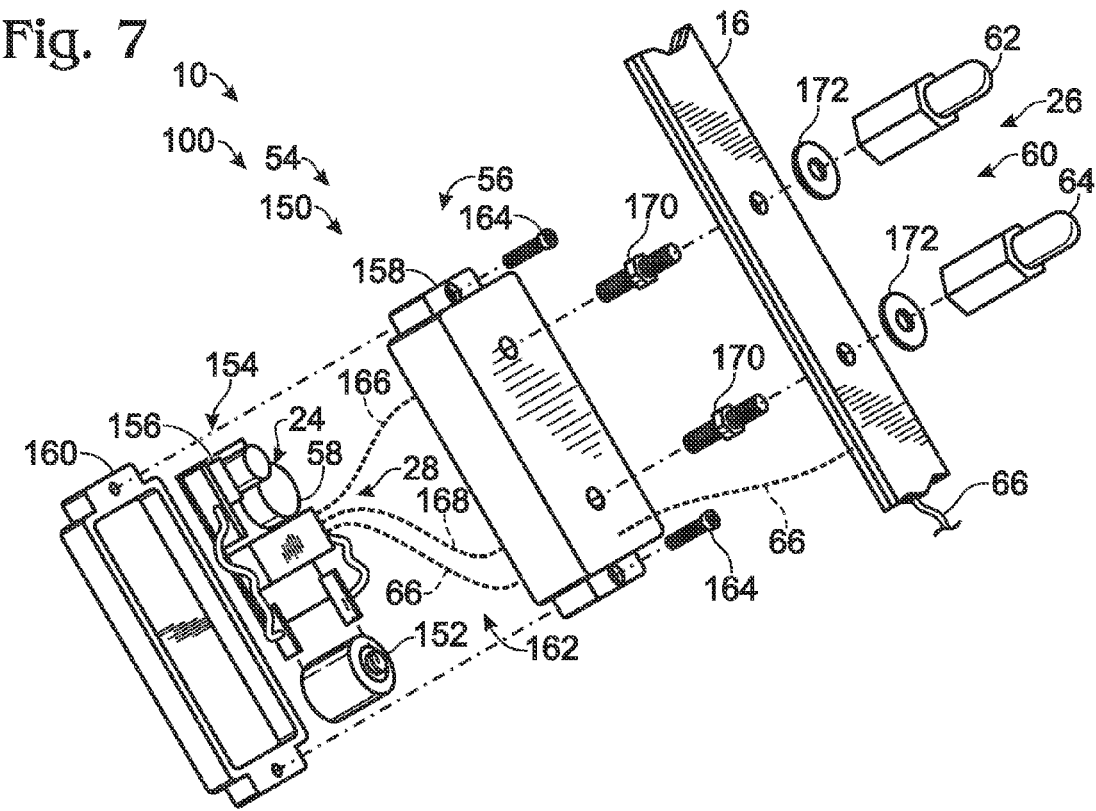
FIG. 7 is an exploded perspective side view of an illustrative, non-exclusive example of a sub-assembly of an animal training system according to the present disclosure.

Turning now to FIGS. 6-7, illustrative, non-exclusive examples of components of a system 10 according to the present disclosure are illustrated. A tension detector 22 is illustrated in FIG. 6, and a sub-assembly 54 is illustrated in FIG. 7.

In FIG. 6, a tension detector 22 of an animal training system 100 is illustrated and generally indicated at 102. As mentioned, the tension detector includes a first end region 50 that is adapted for securement to a lead, and a second end region 52 that is adapted for securement to a collar. Tension detectors 22 generally include a switch 104 and a biasing mechanism 106 adapted to actuate the switch as tension in an associated lead exceeds the threshold tension, such as by the first end region of the tension detector being effectively pulled away from the second end region of the tension detector. The threshold tension associated with systems and methods according to the present disclosure may be at least partially determined, or set, by such factors as the stiffness, or spring rate, of the biasing mechanism, any pre-load on the biasing mechanism, and any internal stiffness, or spring rate, associated with the switch. In some systems according to the present disclosure, the tension detector is adapted for adjustment of the threshold tension, for example, by adjustment of the pre-load on the biasing mechanism, by use with different biasing mechanisms having different stiffnesses, etc.

The illustrative, non-exclusive example 102 of a tension detector 22 illustrated in FIG. 6 includes a coupling mechanism in the form of a D-ring 108, an inner casing 110, a lock nut 112, a switch 104 in the form of a single-pole/single-throw normally-on push-button switch 114 (i.e., a switch that is biased toward its on-position), a biasing mechanism 106 in the form of a compression spring 116, an outer casing 118, and a plunger 122 that includes a rod 124, a switch-engagement disc 125 at a first end region 126 of the plunger, and a coupling mechanism in the form of a hoop 128 at a second end region 130 of the plunger.

D-ring 108 is hingedly coupled to inner casing 110 and provides structure for attachment of the tension detector to an associated collar. Hoop 128 of the plunger provides structure for attachment of the tension detector to an associated lead. It is within the scope of the present disclosure that other releasable or permanent coupling and/or fastening mechanisms may be used in place of the illustrated D-ring and hoop.

Inner casing 110 is a generally cylindrical pipe that includes external threads 127 and an inside volume 129. Switch 114 includes a push-button 131 and an outer rim 132. The inner casing includes an inner lip 134 that extends into the inner casing's inside volume and engages the outer rim 132 of the switch. The inner lip is positioned relative to an end face 136 of the inner casing so that when the switch is in its on-position, the push-button of the switch extends past end face 136 (i.e., toward first end region 50 of the tension detector), and so that when the push-button of the switch is even, or flush, with end face 136, the switch is in its off-position.

Outer casing 118 is a generally cylindrical pipe that includes internal threads 138 that are adapted to mate with the external threads of inner casing 110, an inside volume 140, and an end cap 142. Rod 124 of the plunger extends through the end cap and the inside volume of the outer casing, and the spring 116 is positioned in compression between the switch-engagement disc and the end cap of the outer casing.

Accordingly, when assembled, the outer casing is threaded onto the inner casing and compression is applied to the spring, which in turn biases the switch to its off-position (i.e., with the push-button pushed in and toward second end region 52 of the tension detector). The pre-load of the spring can be adjusted by how far the outer casing is threaded, or screwed, onto the inner casing, and thus the relative distance between the end cap 142 of the outer casing and the end face 136 of the inner casing. The lock nut 112 may then be used to secure the relative positions of the outer and inner casings by tightening the lock nut against the outer casing. Additionally or alternatively, different springs may be provided that have different spring rates and therefore may be selected for different predetermined threshold tensions associated with systems and methods according to the present disclosure.

When coupled between a lead and a collar, and when tension is applied to the lead, the plunger will be pulled away from the second end region 52 of the tension detector, causing the spring to compress between the end cap 142 of the outer casing and the switch-engagement disc 125 of the plunger. The switch-engagement disc will then translate away from the end face 136 of the inner casing. If the tension in the lead exceeds the predetermined threshold tension, the switch-engagement disc unseats from the end face of the inner casing and the push-button is allowed to translate away from the second end region of the tension detector, thus reconfiguring the switch from its off-position to its on-position and sending a signal to the controller via the wiring 66.

An illustrative, non-exclusive example of a sub-assembly 54 of an animal training system 100 is illustrated in FIG. 7 and generally indicated at 150. As mentioned in reference to FIG. 2, sub-assembly 54 includes a housing 56, a first stimulator 24 in the form of a sound emitter 58, and a second stimulator 26 in the form of an electric shock device 60. The sound emitter of sub-assembly 150 is a piezoelectric buzzer, but other sound emitters may be used and are within the scope of the present disclosure. The electric shock device includes first and second probes 62, 64 that extend from housing 56 and are adapted to engage the neck of an animal being trained not to pull excessively on a lead.

Sub-assembly 150 also includes a controller 28, a battery 152, and various associated electronics that, collectively with the switch of an associated tension detector and wiring 66, may be referred to as circuitry 154. In the illustrated example, the controller includes a preprogrammed microprocessor 156.

Housing 56 includes a first portion 158 and a second portion 160, which collectively define an internal volume 162 for housing the various electronics associated with sub-assembly 150, and which are secured together with a pair of fasteners in the form of screws 164. In some versions, housing 56 may be adapted to be water-tight.

As schematically illustrated in FIG. 7 in dashed lines, wiring 66 from the switch of an associated tension detector extends from the collar 16 into the housing and to the electronics as discussed herein. Probes 62, 64 extend through the collar 16 and are electrically coupled to the electronics as schematically illustrated at 166 and 168, via a pair of double-ended screws 170. A pair of washers 172 is also provided between the collar and the probes.

Figure 8:
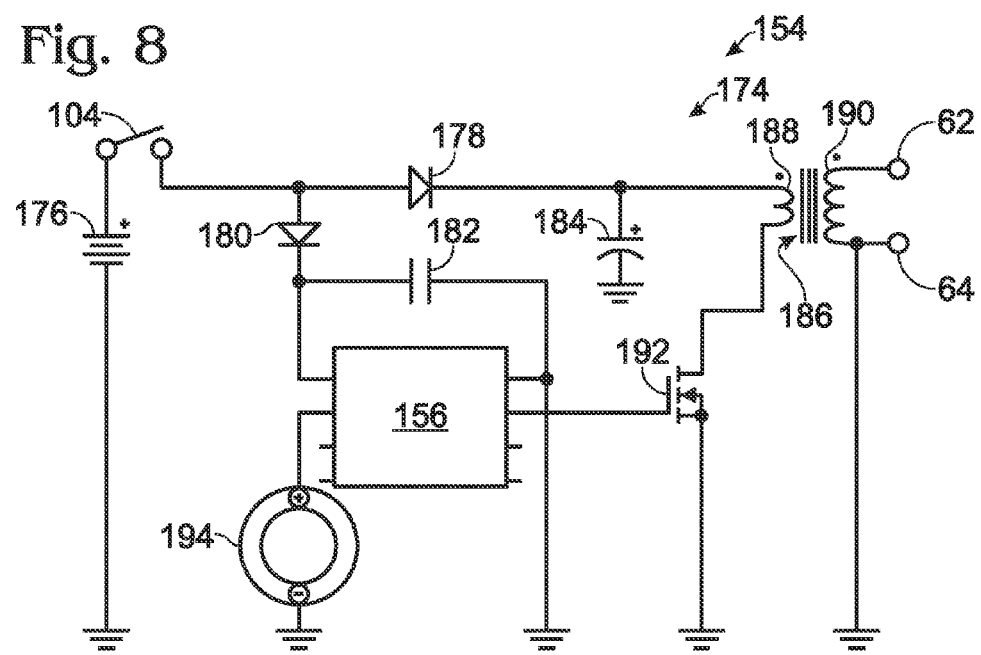
FIG. 8 is an illustrative, non-exclusive example of a wiring diagram of an animal training system according to the present disclosure.

An illustrative, non-exclusive example of circuitry 154 that may be used with animal training systems according to the present disclosure is schematically illustrated in FIG. 8 in the form of a wiring diagram and is generally indicated at 174. As shown, circuitry 174 includes a switch 104 associated with a corresponding tension detector, a power source 176 in the form of a battery, a first diode 178, a second diode 180, a first capacitor 182, a second capacitor 184, a transformer 186 with a primary winding 188 and a secondary winding 190, a transistor 192, a piezoelectric buzzer 194, and a preprogrammed microprocessor 156. The secondary winding 190 of the transformer is electrically coupled to probes 62, 64 of the electric shock device, which as discussed, may form the second stimulator.

When switch 104 is closed, or activated (i.e., configured to its on-position), power is provided to the microprocessor 156 via the second diode 180. In other words, the microprocessor is only powered, and thus the power source, or battery, is only used, when tension in an associated lead exceeds a threshold tension. This is not required for all embodiments but may be useful for conserving battery life. Once powered, the microprocessor will execute its embedded program, which is configured for operation of a system and method according to the present disclosure. Second diode 180 serves to protect the microprocessor should a battery be accidentally inserted backwards into the circuitry. First capacitor 182, which may be a standard disc capacitor, serves to regulate the voltage supplied to the microprocessor and to prevent spikes in voltage thereto. Also, when switch 104 is activated, second capacitor 184, which may be an electrolytic storage capacitor, immediately begins to charge and store capacitance for emission of an electric shock in response to a signal from the microprocessor via transistor 192.

Upon tension in a lead exceeding a predetermined threshold tension (i.e., upon switch 104 reconfiguring to its on-position), as established by a specific configuration of an associated tension detector, microprocessor 156 activates the buzzer 194, thus emitting a first stimulus to an animal being trained with the system. If the animal does not cease pulling, or at least reduce pulling to below the threshold tension, on the lead within a predetermined time preprogrammed in the microprocessor, then the microprocessor generates a square pulse wave to transistor 192. The square wave on the transistor causes the second capacitor 184 to discharge across the primary winding of transformer 186. The transformer steps up the capacitor's discharged voltage to an appropriate level to generate a corrective stimulus in the form of an electric shock across probes 62, 64. As discussed, the voltage to be discharged in a specific embodiment may vary according to a variety of factors, such as the size of animal, type of animal, etc.

As discussed herein, if the animal continues to pull on the lead above the threshold tension, the cycle of audible warning and shock will repeat. If the animal ceases pulling, or at least reduces its pulling to below the threshold tension, switch 104 will open (i.e., reconfigure to its off-position), and the battery 176 will be disconnected. Accordingly, power to the entire circuitry, including the microprocessor, will be eliminated. No square wave will be emitted to the transistor, thus preventing further discharge of the second capacitor 184 and further shock to the animal. First diode 178 prevents the second capacitor from discharging through the microprocessor 156, which would otherwise keep the microprocessor activated, and permit emission of stimuli even after the animal has ceased pulling on the lead above the threshold tension.

Figure 9:
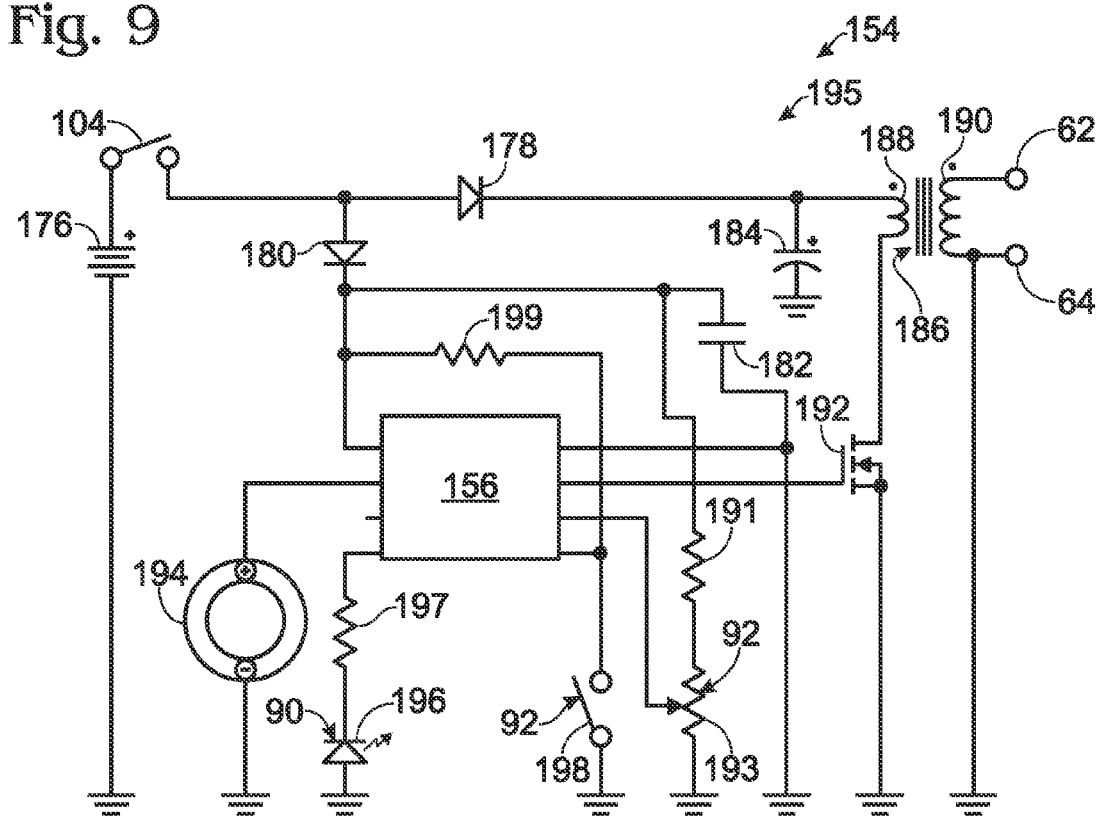
FIG. 9 is another illustrative, non-exclusive example of a wiring diagram of an animal training system according to the present disclosure.

Another illustrative, non-exclusive example of circuitry 154 that may be used with animal training systems according to the present disclosure is schematically illustrated in FIG. 9 and is generally indicated at 195. Circuitry 195 is substantially similar to circuitry 174 illustrated in FIG. 8, but further includes an output 90 and two inputs 92. As shown, the illustrated circuitry includes an output in the form of an LED 196 with associated resistor 197, an input in the form of a switch 198 with associated resistor 199, and an input in the form of a variable resistor 193 with associated resistor 191. Microprocessor 156 may be preprogrammed for a variety of outputs and inputs. For example, LED 196 may be used as a status indicator, for example, illuminating when one or both of the buzzer and the electric shock device are activated. Switch 198 may be used to deactivate the electric shock device, for example, so that the system may be used with the buzzer but without the electric shock. Accordingly, during training of an animal to not pull excessively on a lead, a user may initially begin with the system fully functional, including emission of both a first and second stimuli. As the animal is trained, the user may choose to disable the second stimulus (i.e., the electric shock in the illustrated example), before choosing to completely cease use of the system. Variable resistor 193 may be used to permit a user to adjust the intensity of the electric shock administered by the system, for example, to adjust for different sizes or sensitivities of different animals. Other configurations of circuitry 154, including other configurations of outputs 90 and inputs 92, are within the scope of the present disclosure.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A system for training an animal not to pull excessively on a lead coupled to a collar on the animal, the system comprising:
  a corrective assembly coupled to the collar and the lead, the corrective assembly including:
    a tension detector adapted to detect when a tension in the lead exceeds a predetermined force;
    a first stimulator adapted to emit a first stimulus to the animal;
    a second stimulator adapted to emit a second stimulus to the animal, wherein the second stimulus is different from the first stimulus; and
    a controller adapted to:
      actuate the first stimulus in response to the tension in the lead exceeding the predetermined force;
      actuate the second stimulus only in response to the tension in the lead exceeding the predetermined force for a first predetermined non-zero length of time after actuation of the first stimulus and not in response to the tension in the lead exceeding a force that is greater than the predetermined force; and
not actuate the first stimulus or the second stimulus, for a second predetermined non-zero length of time, after actuation of the first and second stimulus irrespective of whether the tension in the lead remains above the predetermined force.

2. The system of claim 1, wherein the corrective assembly further includes a storage device adapted to store a potential for actuation of the second stimulus, and further wherein the corrective assembly is adapted to charge the storage device with the potential only when the tension in the lead exceeds the predetermined force and to discharge the potential only when the tension in the lead exceeds the predetermined force for the first predetermined non-zero length of time.

3. The system of claim 1, wherein the first stimulus includes a sound and the second stimulus includes an electric shock.

4. The system of claim 1, wherein the first stimulus does not include an electric shock and the second stimulus includes an electric shock.

5. The system of claim 1, wherein the controller is further adapted to continuously actuate the first stimulus in response to the tension in the lead exceeding the predetermined force until the tension in the lead reduces to below the predetermined force.

6. The system of claim 1, wherein the controller is further adapted to continuously actuate the first stimulus in response to the tension in the lead exceeding the predetermined force until the actuation of the second stimulus.

7. The system of claim 6, wherein the controller is further adapted to continuously actuate the second stimulus, until the earlier of (i) the tension in the lead reducing to below the predetermined force or (ii) a second predetermined non-zero length of time.

8. The system of claim 1, wherein the corrective assembly further includes a capacitor adapted to store electric potential for actuation of the second stimulus, and further wherein the controller is further adapted to charge the capacitor only after the tension in the lead exceeds the predetermined force and to discharge the electric potential only when the tension in the lead exceeds the predetermined force for the first predetermined non-zero length of time.

9. The system of claim 8, wherein the corrective assembly is adapted to prevent charging of the capacitor if the tension in the lead is not above the predetermined force.

10. The system of claim 1,
wherein the controller is further adapted to generate a square pulse wave in response to the tension in the lead exceeding the predetermined force;
wherein the second stimulator includes a transformer having a primary winding and a secondary winding, the secondary winding adapted to emit the second stimulus to the animal; and
wherein the corrective assembly further includes:
a capacitor electrically coupled to the primary winding of the transformer and adapted to store electric potential for actuation of the second stimulus; and
a transistor electrically coupled between the controller and the primary winding of the transformer and adapted to actuate a discharge of the capacitor in response to the square pulse wave.

11. The system of claim 1,
wherein the tension detector includes a switch; and
wherein the corrective assembly further includes a battery in series with the switch and the controller, wherein the switch prevents powering of the controller except when the tension in the lead exceeds the predetermined force.

12. The system of claim 1, wherein the tension detector includes:
a first portion coupled to the collar;
a second portion slidingly coupled to the first portion and adapted to be coupled to the lead;
wherein the first portion includes:
a switch electrically coupled to the controller, the switch having an open configuration and a closed configuration; and
a bias mechanism that biases the second portion toward the collar and the switch toward the open configuration;
wherein if the tension in the lead exceeds the predetermined force, the second portion translates relative to the first portion away from the collar and the switch is reconfigured from the open configuration to the closed configuration.

13. The system of claim 12, wherein the first portion is adapted to permit adjustment of a pre-load on the bias mechanism and thereby facilitate adjustment of the predetermined force.

14. The system of claim 1, wherein the corrective assembly includes the collar, and wherein the tension detector interconnects the lead to the collar.

15. The system of claim 1, wherein the controller includes a microprocessor that is preprogrammed with the first predetermined non-zero length of time.

16. The system of claim 1, in combination with the collar and the lead.

17. The system of claim 1, wherein the tension detector is adapted to send a signal to the controller only when the tension in the lead exceeds the predetermined force.

18. The system of claim 1, wherein the second stimulus is configured to be of a greater corrective nature than the first stimulus.

19. The system of claim 1, wherein the controller is further adapted to continuously actuate the first stimulus in response to the tension in the lead exceeding the predetermined force until the earlier of (i) the tension in the lead reducing to below the predetermined force or (ii) actuation of the second stimulus.

20. The system of claim 1, wherein the corrective assembly further includes an input adapted to receive a setting of the predetermined force.

21. The system of claim 1, wherein the corrective assembly further includes an input adapted to receive a setting of a level of intensity of at least one of the first stimulus and the second stimulus.

22. The system of claim 1, wherein the corrective assembly further includes an input adapted to receive a setting of the first predetermined non-zero length of time.

23. The system of claim 1, wherein the tension detector includes a switch electrically coupled to the controller and biased toward an open configuration, and wherein if the tension in the lead exceeds the predetermined force, the switch is reconfigured from the open configuration to a closed configuration.

24. The system of claim 1, wherein the corrective assembly further includes a status indicator adapted to indicate at least one of actuation of the first stimulus, actuation of the second stimulus, and the intensity of at least one of the first stimulus and the second stimulus.

25. The system of claim 1, wherein the first predetermined non-zero length of time is less than four seconds.

26. The system of claim 1, wherein the first predetermined non-zero length of time is less than two seconds.

27. The system of claim 1, wherein the first predetermined non-zero length of time is one second or less.

28. A system for training an animal not to pull excessively on a lead coupled to a collar an on the animal, the system comprising:

a corrective assembly coupled to the collar and the lead, the corrective assembly including:

means for detecting when a tension in the lead exceed a predetermined force;

means for emitting a first stimulus to the animal;

means for emitting a second stimulus to the animal, wherein the second stimulus is different from the first stimulus;

means for actuating the first stimulus in response to the tension in the lead exceeding the predetermined force;

means for actuating the second stimulus only in response to the tension in the lead exceeding the predetermined force for a first predetermined non-zero length of time after actuation of the first stimulus and not in response to the tension in the lead exceeding a force that is greater than the predetermined force; and means for not actuating the first stimulus and the second stimulus for a second predetermined non-zero length of time after actuation of the first and second stimulus irrespective of whether the tension in the lead remains above the predetermined force.

* * * * *